Sept. 28, 1926.

G. FORNACA

COUPLING OF TRACTORS AND TRAILERS

Filed Jan. 17, 1925   2 Sheets-Sheet 1

1,601,245

Inventor
Guido Fornaca,
By
Atty.

Sept. 28, 1926.

G. FORNACA 1,601,245

COUPLING OF TRACTORS AND TRAILERS

Filed Jan. 17, 1925    2 Sheets-Sheet 2

Inventor
Guido Fornaca
by Laurent
att.

Patented Sept. 28, 1926.

1,601,245

UNITED STATES PATENT OFFICE.

GUIDO FORNACA, OF TURIN, ITALY.

COUPLING OF TRACTORS AND TRAILERS.

Application filed January 17, 1925, Serial No. 3,055, and in Italy January 18, 1924.

The object of this invention is to provide improved means for coupling a tractor and a trailer, which shall be particularly suitable for use in connection with tractors intended to haul artillery or heavy vehicles.

To the attainment of this object I provide the tractor with a coupling comprising a rod or bar pivoted on the tractor for movement in a horizontal plane, means for guiding the rod or bar in such movement and preventing vertical movement thereof, and a bell coupling hook or equivalent coupling member jointed to the rod or bar for rotational and radial movements.

The arrangement eliminates abnormal strain on the haulage parts due to variations in the relative positions of the tractor and the trailer while preventing swinging movements and collision between the coupled vehicles, which occur when coupling is effected by an entirely flexible arrangement such as a chain. Furthermore, it prevents lateral jolts and shocks which occur in known systems of coupling endless track tractors.

The appended drawing shows, by way of example, one form of the coupling applied to a heavy type endless track tractor.

Figure 2:
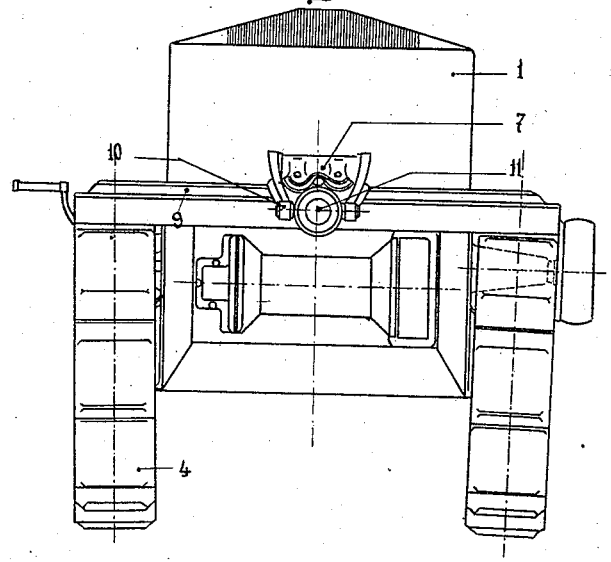
Figure 1:
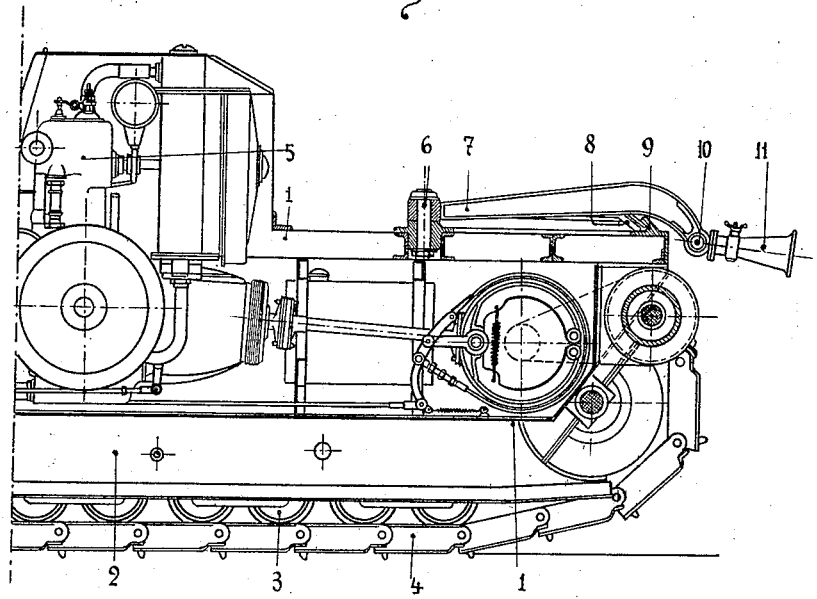
Figure 3:
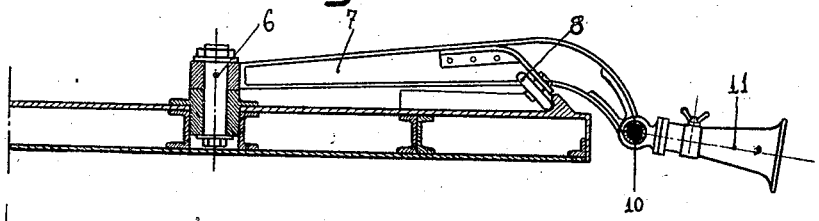
Figure 4:
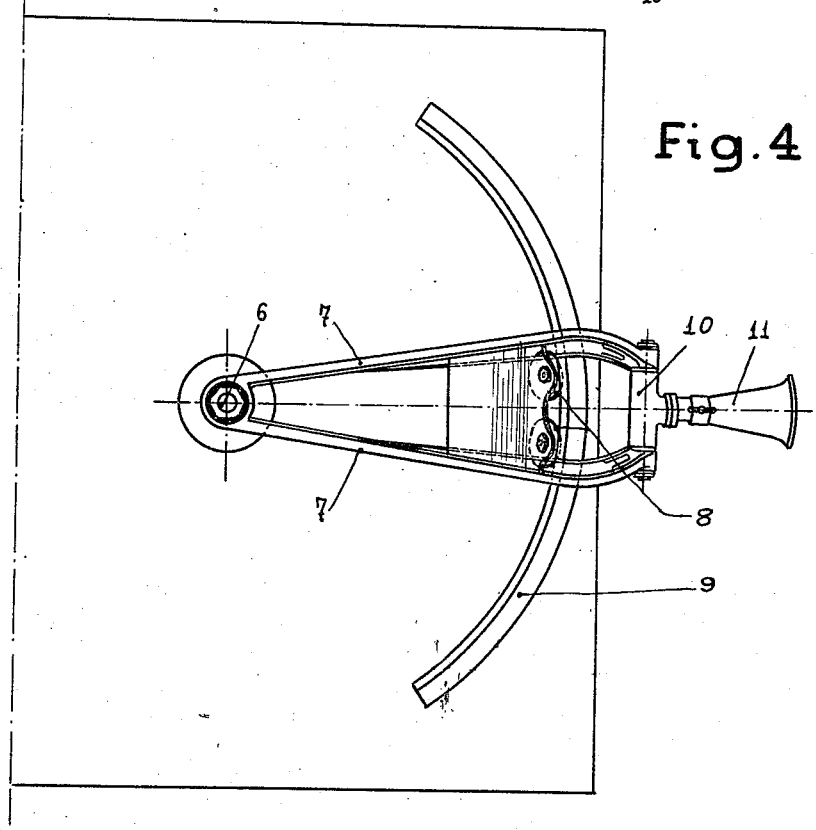

Fig. 1 represents a longitudinal vertical section through the tractor and Fig. 2 is a rear view, Fig. 3 is a side elevation of the connecting bar, Fig. 4 is a plan view thereof.

In the drawing, the reference 1 denotes the body of the tractor which is supported by longitudinal frame members 2 having wheels 3 engaged by the endless track 4. The track is driven by a motor 5 through suitable gears.

Pivoted to the body 1 of the tractor by means of a pin 6 is a rod or bar 7 which is free to swing in a horizontal plane but restrained against vertical movements by an extension 8 engaging under a guide piece 9 fitted on the body of the tractor and curved in an arc of a circle having its centre in the axis of the pivot pin 6.

The end of the rod or bar 7 remote from the pin 6 is provided with a swivel joint 10 to which a bell coupling hook 11 of known form is connected so as to be capable of rotation about its longitudinal axis. Thus the hook 11 is jointed to the rod or bar 7 for rotational and radial movements.

Coupling between the tractor and the trailer is effected by engaging the draw bar or some other suitable part of the latter with the bell hook 11, whereafter all variations of parallelism between the trailer and tractor and relative up and down movements are rendered possible by the rotation of the bell 11 and swinging movements of the joint 10, while the differences of alignment due to passing over obstacles, to turning and to the constant steering movements of the tractor are permitted by pivotal movement of the rod or bar 7.

On the other hand the distance between the trailer and the tractor will be practically invariable owing to the perfectly rigid coupling longitudinally, thus eliminating the continued shocks due to variation in the pull exerted on the trailer, which shocks are intensified by a flexible means of transmission, owing to the possibility of relative accelerations between the coupled vehicles.

Instead of making the bell 11 revolve, the part of the trailer to which it is coupled may be arranged to rotate in the bell. The constructive details of the coupling can also be modified in various other ways without departing from the spirit or scope of the invention; and the coupling can of course be applied to tractors other than the type represented in the drawing.

What I claim is:

In a draft device, the combination of a tractor, a draw-bar pivotally mounted thereon to swing in a horizontal plane, an arcuate guide rail mounted on the tractor concentric to the pivot of the draw-bar and inclined toward its center, a projection on the draw-bar engaging under said guide-rail for taking the vertical strains on the draw-bar, and a coupling member comprising a joint element oscillating in a vertical plane and a hook mounted capable of turning on its longitudinal axis.

In testimony that I claim the foregoing as my invention, I have signed my name.

GUIDO FORNACA.